May 18, 1943.  M. A. L. PERREY  2,319,342
APPARATUS FOR DETERMINING THE RESISTANCE TO
FRACTURE OF TEST-PIECES
Filed May 10, 1938  3 Sheets-Sheet 1
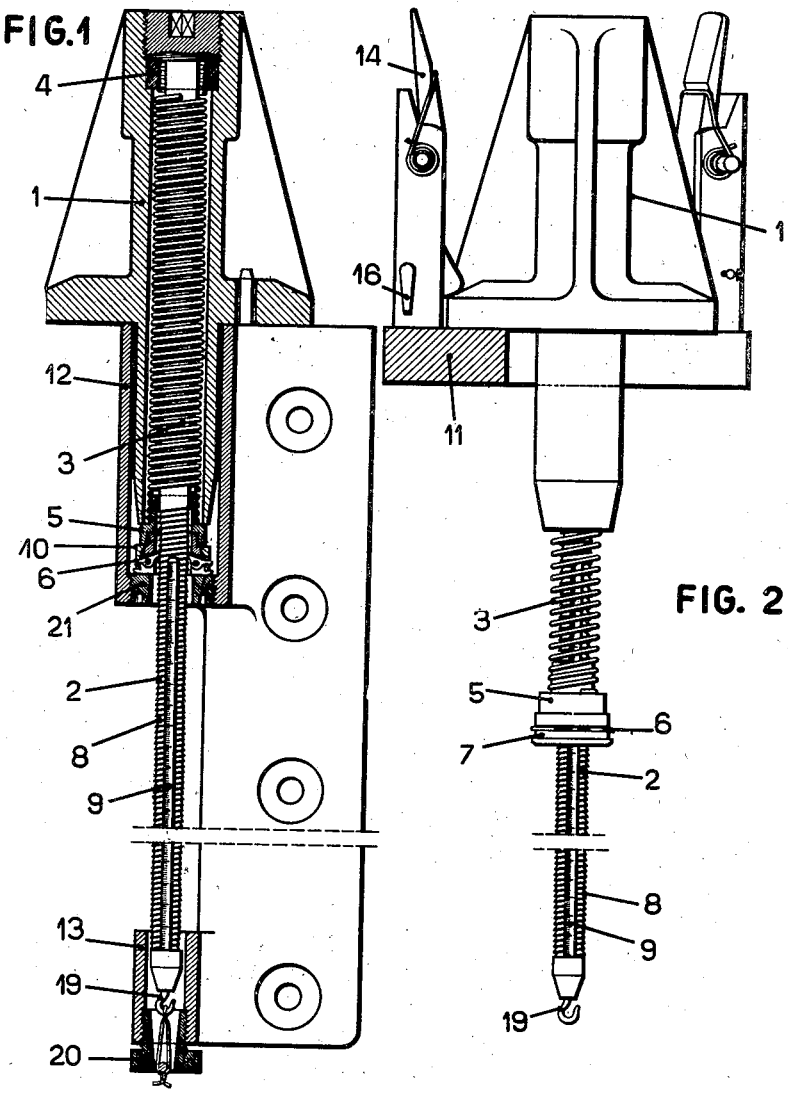

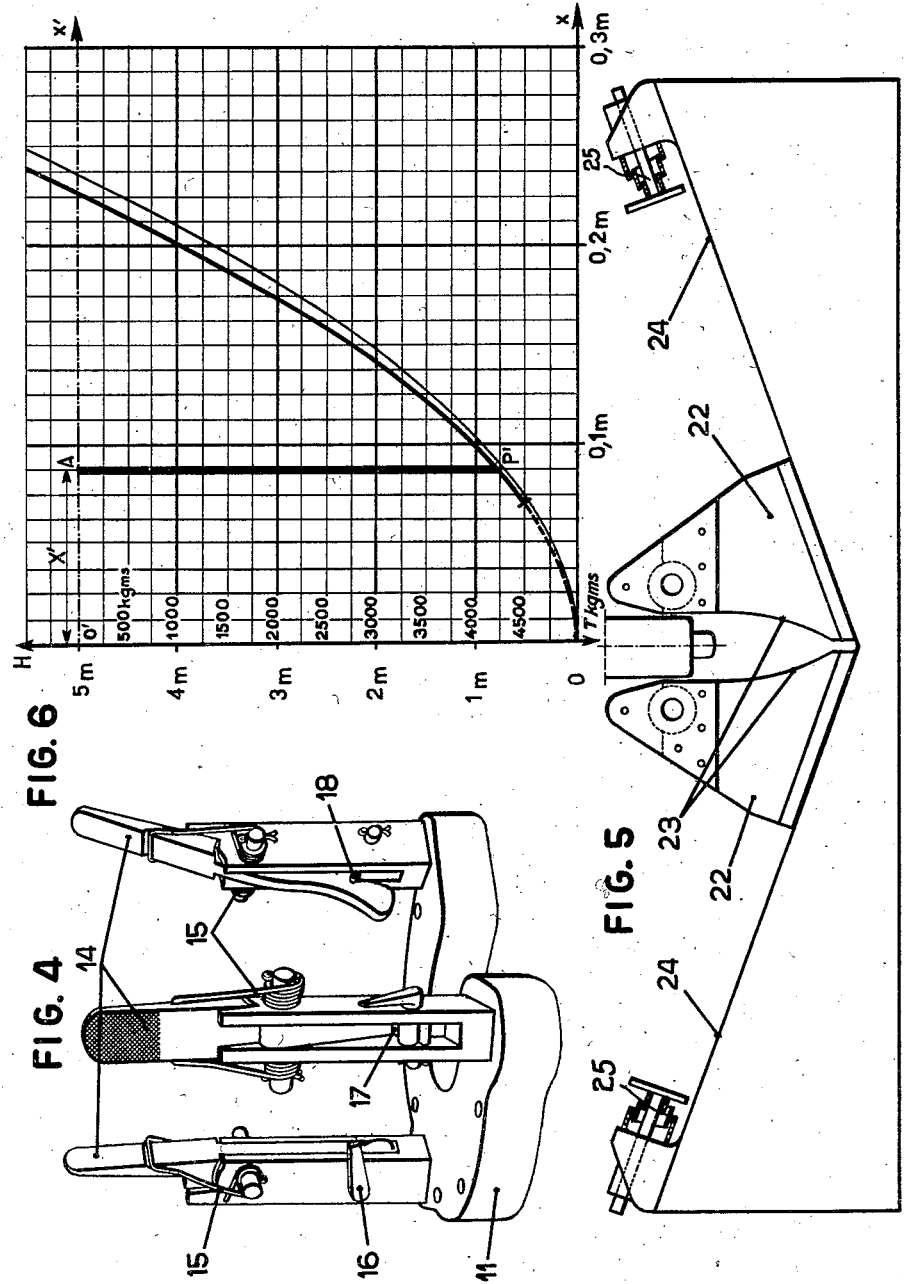

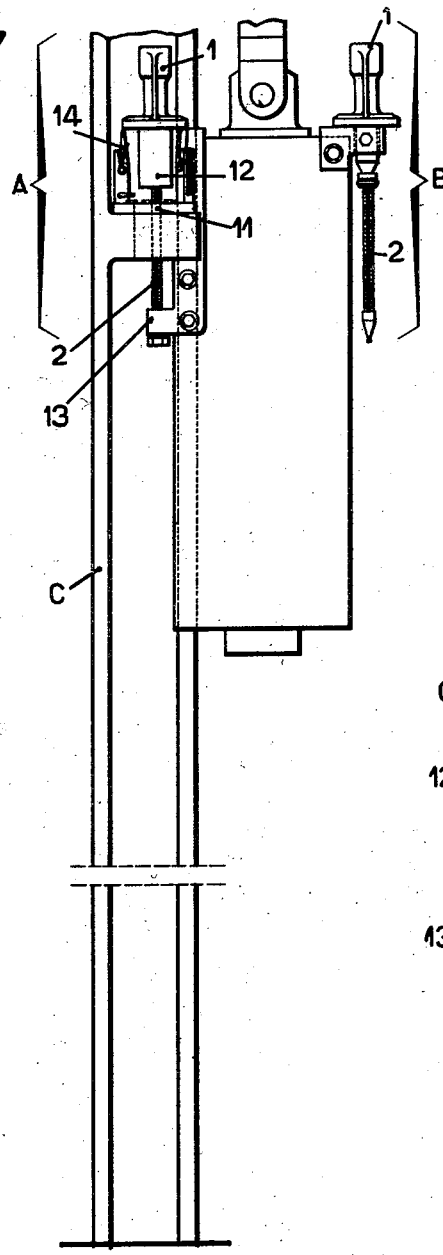
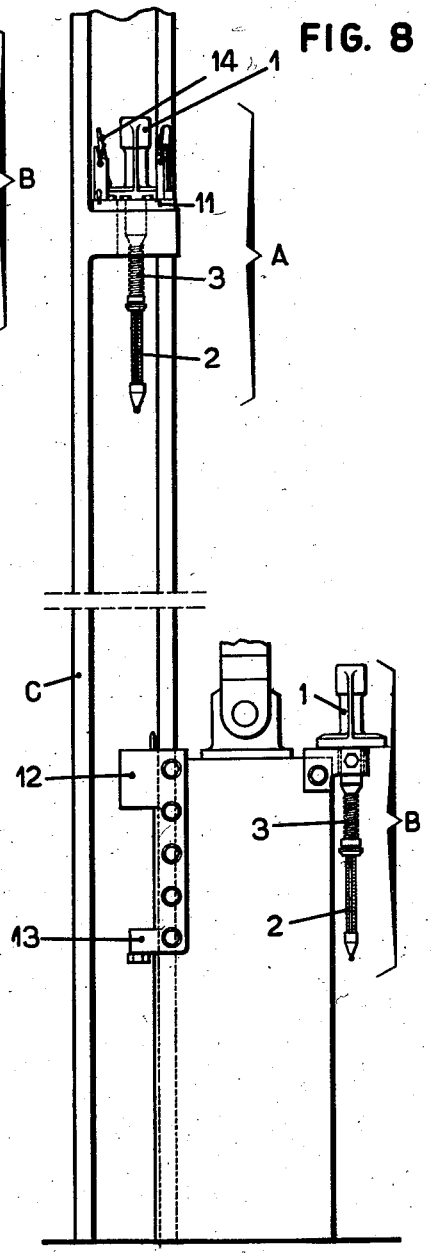

Patented May 18, 1943

2,319,342

UNITED STATES PATENT OFFICE 2,319,342

APPARATUS FOR DETERMINING THE RESISTANCE TO FRACTURE OF TEST PIECES

Marcel Augustin Léon Perrey, Herserange, France; vested in the Alien Property Custodian Application May 10, 1938, Serial No. 207,114
In France May 27, 1937

5 Claims. (Cl. 265—13)

In the copending application Serial No. 144,530 filed May 24, 1937, now Patent No. 2,177,876, granted October 31, 1939, is described a method consisting in accurately determining the residual momentum or kinetic energy of an impact member for a known position of said member after the work has been done and, for example, after the breaking of a rail and then in deducing from this measurement of residual momentum or kinetic energy, by indirect calculation, the energy to be measured (in the case of the breaking of a rail, the energy is substantially represented by the area of the breaking diagram).

In the same application has been described an apparatus for carrying out said method. Said apparatus essentially comprises a weight associated with an accurate spring which is calibrated and locked by an appropriate device to one of the angles of the impact member or of the tup used, so that the weight assembly is rigidly secured to the tup and consequently has the same speed before, during and after the work done (for example the breaking of the rail) up to the position chosen for measuring the residual momentum.

At the precise instant when the apparatus occupies the aforesaid position, the weight-calibrated spring assembly is automatically separated from the tup by a bracket provided with an appropriate device to lock instantaneously the head of the assembly and to prevent any rebound of the latter.

The momentum of the weight-calibrated spring system which has the same speed as the tup, imparts to the spring a certain elongation which can be measured on a graduation by simply reading, owing to the locking, by any appropriate means, the position of the weight at the lowest point of its travel.

The applicant has calculated the theoretical equation between the height of fall of the apparatus and the elongation of the spring. Said equation can be represented by a parabolic law of the following form: $x^2 = 2fh(p + p'/2)$ in which $x$ designates the elongation in metres of the spring, $f$ the deflection of the spring in metres per kilogram load, $p$ the weight in kilograms of the weight, $p'$ the weight in kilograms of the spring and $h$ the height of the fall in metres.

In practice, the above equation is not parabolic, but it can be determined by experiment and a calibration curve is obtained which is almost a parabola so that if the elongation $x$ of the spring is known, the height of fall $h$ is obtained, which enables the work done to be calculated, such as the work required for breaking a rail.

The present invention relates to improvements in the said apparatus for measuring the work done and particularly for measuring the work for breaking a rail. These improvements are:

(a) Use of an improved device intended to effect the locking of the weight on its guide rod, when it reaches the lowest position of its travel, and the unlocking of same after its travel has been read on the graduation carried by its guide rod, said unlocking being effected by manually unscrewing a threaded ring or an appropriate member;

(b) Use of an impact bracket, the particular and novel arrangement of which enables any rebound of the head of the apparatus to be prevented, owing to the provision of locking latches which are associated with opposing springs and set by very light members which are moved down by the head of the measuring apparatus, thereby preventing shock on the latches before the impact. Said latches are reset at will by suitable members after the breaking of the rail or any other article to be tested, so as to enable the apparatus to return to its initial position with the tup;

(c) Realization of a resilient vertical locking of the apparatus on the tup, by means of a semirigid member which is adapted to break at the instant the impact occurs, so as to prevent, before the impact, any vibration or any relative vertical movement of the measuring apparatus with respect to the tup, thereby procuring great reliability of operation;

(d) Locking, before the impact, of the weight relatively to the measuring apparatus and relatively to the tup owing to the locking of the upper part of the weight against the head of the apparatus, and of the lower part of said weight against a hollow abutment secured to the tup, so as to prevent any untimely vibration during the operation of the apparatus;

(e) Use of heavy rests placed on inclined planes provided on the anvil block so as to hold said rests in their operative position and thereby prevent their moving during the breaking of the test piece such as a rail;

(f) In arrangement of the rests of which the inner walls are provided in the upper zone with a plane surface so as to allow the tup to pass freely in said zone whereas the lower zone of the inner surface of the same rests has the shape of a parabola so as to produce a braking of the tup toward the end of its travel and before it impinges on the anvil block; any destructive impact on the anvil block is thus avoided.

The applicant has also observed that the measuring apparatus described in the copending application 86,012 of June 18, 1936, now Patent 2,163,847 granted June 27, 1939, accurately gives the maximum retarding acceleration of the tup during the breaking and, consequently (if the mass of the tup is known) the maxium breaking stress the value of which corresponds to the length of the maximum ordinate of the breaking diagram.

Consequently it has occurred to the applicant to provide the tup with two apparatuses preferably arranged at two corners of the tup, one of which is the same as the measuring apparatus according to the invention and enables the breaking energy of the rail in operation to be ascertained after the breaking of said rail, whereas the other, which is similar in its principle to the device described in the afore-mentioned patent application, is provided with a weight-calibrated spring assembly which is identical with the corresponding device of the apparatus according to the invention, but has no impact device, and consequently remains secured to the tup, so as to enable the maximum breaking stress to be measured.

The invention also covers the apparatus obtained by combining the two aforesaid measuring devices with the same tup, said devices respectively giving the breaking energy and the maximum breaking stress.

In order to enable the invention to be better understood, the preferred embodiment has been shown in the accompanying drawings in an indicative and non-limitative manner.

In said drawings:

Fig. 1 is a view in sectional elevation of the improved apparatus which is the object of the invention;

Fig. 2 is an elevational view of the apparatus which is the object of the invention, after separation from the tup;

Fig. 3 is a detail view of the device which enables the weight to be locked and unlocked on its guide rod;

Fig. 4 is a perspective view of the impact bracket provided with devices for locking the head of the measuring apparatus after impact;

Fig. 5 is an elevational view of the arrangement of parabolic rests with inclined plane anvil-block;

Fig. 6 shows a graph on which an experimental calibration curve has been plotted;

In Figs. 7 and 8 a tup has been shown which is provided with improved devices which respectively enable the measurement to be effected of the breaking energy of a rail and of the maximum breaking stress.

If reference is had to Fig. 1, it will be seen that the apparatus according to the invention essentially comprises: an apparatus head 1, which is preferably made of duralumin and is used first for locking the apparatus on the tup, then as an impact member; a guide rod 2 fixed and centred on the head 1 of the apparatus; an accurate spring 3 which operates in tension and of which the upper convolutions are screwed into a ring 4 which is secured to the head 1; a weight 5 in which slides the rod 2 and which is screwed on the lower convolutions of the spring 3 and a device for indicating the travel of the weight.

For recording the length of the travel of the weight, as can be more particularly seen in Fig. 3, pawls 6 mounted on the member 10' have been provided which are urged by a rubber ring 7 and are placed in engagement with the helical thread 8 of the rod 2. The weight thus set can move downwards but cannot move upwards again. The travel of the weight is read on a graduation 9 marked on the rod 2. By unscrewing a threaded ring 10 threaded on the member 10' the rubber ring 7 is compressed whereby the pawls 6 are retracted. The weight 5 is thus released at will and it can be replaced in the operative position which corresponds to the zero point on the graduation 9.

In Fig. 2 an elevation has been shown of the apparatus according to the invention, after impact of the head 1 on the impact device 11, which impact causes the separation of the apparatus from the tup.

The impact bracket 11 which is of horse-shoe shape, is supported by a concave column which is preferably made of steel (not shown in Figs. 1 and 2) and which extends down to the anvil block. The head 1 of the apparatus and the rod 2 fit respectively into two bored cylindrical brackets 12 and 13 secured to the tup. The horizontal locking of the apparatus on the tup is thus obtained. The two brackets 12 and 13 pass freely between the arms of the horse-shoe, but the apparatus head 1 will not pass and impinges on the impact bracket 11.

At the same instant the device becomes operative which is intended to lock the apparatus head 1 on the bracket and to prevent any rebound. Locking is effected, as can be seen in Fig. 4, by means of three latches 14 which are actuated by springs 15. In order to prevent any shock on the latches before the impact, the applicant has provided three double-acting levers 16 which set the locking latches 14 through the instrumentality of fingers 17 which are secured to the pivots of the levers 16 and are adapted to penetrate into notches 18 provided on the latches 14.

In the embodiment shown in Fig. 4, when the double-acting levers 16 are horizontal and are directed towards the inside of the horse-shoe, the latches 14 are set. Such is the case for the left hand latch of Fig. 4. In its fall, the apparatus head deflects the levers 16 pushing same down with a very small force and said levers release the locking latches 14.

It has been assumed in Fig. 4 that the right hand latch was released. When the latches are thus released, they project from their housing and prevent the head from rebounding after the impact on the bracket 11.

When the levers 16 are horizontal but directed towards the outside, the latches are deflected by means of fingers which are secured to the pivots of the levers 16 and are identical but diametrically opposite to the aforesaid fingers and penetrate into the same notches 18. The latches being thus released, the apparatus can move upwards again freely with the tup.

A resilient vertical locking of the apparatus on the tup has been obtained by means of a simple copper wire stretched between a hook 19 provided at the lower end of the rod 2 and a screw-tightener 20. When the impact occurs, this semi-rigid connecting member which forms a kind of mechanical fuse, is broken. This device offers the advantage of great reliability.

In working order, the spring 3 only supports the weight which is at the zero graduation and is locked at the top against the apparatus head and at the bottom by the hollow abutment 21 which is screwed in the bracket 12 and which allows the rod 2 to pass freely, as can be seen in Fig. 1. Any untimely vibration during operation is thus prevented, the weight being completely locked relatively to the measuring apparatus and relatively to the tup before the impact.

Fig. 5 shows the preferred arrangement of parabolic rests with inclined plane anvil block. This arrangement is provided with rests 22 which have their inner faces vertical at the top then of parabolic shape at the bottom in the zone 23. The tup passes freely in the upper part and it is in this zone that the measurement of the residual momentum is effected, then the tup penetrates like a wedge between the parabolic surfaces; it is braked and imparts a uniformly accelerated movement to the rests. The rests are set in motion on the inclines 24 the slope of which is such that gravity automatically returns them to their starting position. Spring abutments 25 are provided on the inclines 24. With sufficiently heavy rests and sufficiently long inclines, any destructive impact on the anvil block is thus avoided.

In Fig. 6, beside a theoretical parabola shown in thin lines, an experimental calibration curve has been shown in thick lines and which is obtained by measuring the elongation of the calibrated spring 3 corresponding to different heights of fall which are taken, to give an idea and by way of indication, between 0 and 5 metres. It will then be observed that, given this curve, which has been shown in Fig. 6 relatively to two co-ordinate axes OX and OH, it is immediately possible to find by simply reading off the curve, for a value of X measured on the graduation 9 of the apparatus, a corresponding height of fall H.

The breaking energy T is then given by the equation:

$$T = P(h - H) = Ph - PH$$

In the above equation $h$ represents the distance between the initial position of the tup and the position chosen for measuring the residual kinetic energy after rupture and H represents the corresponding distance for the residual kinetic energy of the tup as deduced from the calibration curve of Fig. 6.

In the above equation P is the weight of the tup.

This equation is obtained by stating that the breaking energy is equal to the difference between the momentum which the tup would have at the level of the measurement, if the rail were not broken and the residual momentum which is measured when the rail is broken. For a tup of 1000 kgs., which falls from a height of 5 metres, taken between the initial position of the tup and the position chosen for measuring the residual momentum, the equation takes the form:

$$T = 1000 \ (5 - H) = 5000 - 1000 \ H$$

In order to obtain the direct reading of the breaking energy from the graph, a change of coordinates is effected by taking O'X' and O'T as new axes, such that OO'=5 metres. Consequently, if the elongation of the spring measured on the graduation 9 after breaking the rail is X', the corresponding point P' is marked on the curve and the breaking energy is read off which is equal to the ordinate AP' of the point P'.

In order to completely utilize the possibilities of the device which is the object of the invention, the applicants have considered it advantageous to equip the same tup with two measuring apparatuses. By means of this combination, an aggregate arrangement is obtained which is shown in Fig. 7.

An apparatus A, which is similar to the improved measuring device which is the object of the invention gives, when operating after the test-piece has been broken, the breaking energy of a rail for example, owing to the use of horse-shoe impact bracket supported by a column C which extends down to the anvil block.

An apparatus B arranged to another corner of the tup is equipped with a weight-spring system identical with that of the apparatus A, but it does not co-operate with any impact device; it is permanently locked on the tup and the elongation of its calibrated spring measures the maximum breaking stress.

If $y$ is the reading of the second apparatus (B), the maximum breaking stress F is given by $$F = \frac{y}{f} \cdot \frac{P}{p + \frac{p'}{2}} = Ky$$

K is a constant of the apparatus.

$$K = \frac{P}{f\left(p + \frac{p'}{2}\right)}$$

Fig. 8 shows the positions of the weights of the two apparatus A and B after breakage of the rail with the relative positions exaggerated for greater clearness.

While the apparatus A indicates the work necessary for breaking a rail the apparatus B is designed to measure the maximum energy of the breaking. By combining these two apparatuses upon the single and same tup it is possible to obtain simultaneously two readings upon the graduations, the area and the maximum ordinate of the breaking diagram for each test-piece and the combination of these two indications which mutually complete and check one another permits the maximum reliability for the accurate classification of the test-piece such as a rail, in the varied gamut of industrial qualities. Experience has shown that these indications of the two apparatuses harmonize in the great majority of cases.

It is of course understood that various modifications, additions and improvements may be made in the measuring apparatus which is the object of the invention, without for that reason altering the general system of the invention. Thus, it is possible to use very varied materials for constructing the various members of said apparatus. It is also possible to provide very different devices for effecting a temporary connection between the tup and the guide rod of the measuring apparatus, which connection has to be removed at the instant when the head of the apparatus impinges on its impact device.

In the explanation which has just been given, the application of the apparatus according to the invention has been considered in the case in which it is required to measure the breaking energy of a rail. It is of course understood that the invention is not limited to this application and that it includes impact devices or tup apparatus for testing any articles.

What I claim is:

1. An apparatus for determining the kinetic energy required to rupture a body comprising a mass for rupturing said body, a head removably mounted on said mass, an auxiliary weight mounted on said head, an impact base for receiving said head from said mass, a calibrated spring connected to said weight and to said head, guiding means secured to said head for said weight, means for indicating the distance travelled by said weight along said guiding means, breakable means for locking said head on said mass prior to the removal of said head from said mass by said impact base, means for rendering said weight and spring inoperative prior to impact and upon impact rendering them operative and means for locking said head to said impact base upon impact to prevent rebound.

2. An apparatus for determining the kinetic energy required to rupture a body comprising a mass for rupturing said body, a head removably mounted on said mass, an auxiliary weight mounted on said head, an impact base for receiving said head from said mass, a calibrated spring connected to said weight and to said head, guiding means secured to said head for said weight, means for locking said weight on said guiding means when said weight reaches its lowest position on said guiding means, manually operable rotary means for releasing said weight from said guiding means, frangible means for locking said head on said mass prior to the removal of said head from said mass upon impact of said head with said impact base, means for rendering said weight and spring inoperative prior to impact and upon impact rendering them operative and means for locking said head to said impact base upon impact to prevent rebound.

3. An apparatus for determining the kinetic energy required to rupture a body comprising a mass for rupturing said body, a head removably mounted on said mass, an auxiliary weight mounted on said head, an impact base for receiving said head from said mass, a calibrated spring connected to said weight and to said head, guiding means secured to said head for said weight, means for indicating the distance travelled by said weight along said guiding means, means for locking said head on said mass prior to the removal of said head from said mass upon impact of said head with said impact base, means for rendering said weight and spring inoperative prior to impact and upon impact rendering them operative and means for locking said head to said impact base upon impact to prevent rebound, said last named means comprising locking latches, resilient means for actuating said latches and means for setting and releasing said latches operable by said head immediately prior to impact with said base.

4. An apparatus as set forth in claim 1 in which said means for locking said head on said mass comprises means breakable at the impact of said head with said impact base.

5. An apparatus for determining the kinetic energy required to rupture a body comprising a mass for rupturing said body, a head removably mounted on said mass, and auxiliary weight mounted on said head, an impact base for receiving said head from said mass, a calibrated spring connected to said weight and to said head, guiding means secured to said head for said weight, means for indicating the distance travleled by said weight along said guiding means, means for locking said head on said mass prior to the removal of said head from said mass upon impact of said head with said impact base, means for locking said head to said impact base upon impact to prevent rebound, and a hollow abutment on said mass cooperating with said head for preventing untimely vibration of said weight during operation and rendering said weight and spring inoperative prior to impact.

MARCEL AUGUSTIN LÉON PERREY.